United States Patent
Stein et al.

(10) Patent No.: US 7,283,628 B2
(45) Date of Patent: Oct. 16, 2007

(54) PROGRAMMABLE DATA ENCRYPTION ENGINE

(75) Inventors: Yosef Stein, Sharon, MA (US); Haim Primo, Tikwa (IL)

(73) Assignee: Analog Devices, Inc., Norwood, MA (US)

( * ) Notice: Subject to any disclaimer, the term of this patent is extended or adjusted under 35 U.S.C. 154(b) by 722 days.

(21) Appl. No.: 10/170,267

(22) Filed: Jun. 12, 2002

(65) Prior Publication Data

US 2003/0103626 A1 Jun. 5, 2003

Related U.S. Application Data

(60) Provisional application No. 60/355,337, filed on Feb. 7, 2002, provisional application No. 60/341,711, filed on Dec. 18, 2001, provisional application No. 60/341,737, filed on Dec. 18, 2001, provisional application No. 60/334,662, filed on Nov. 30, 2001.

(51) Int. Cl.
H04L 9/06 (2006.01)
H04L 9/18 (2006.01)

(52) U.S. Cl. .................. 380/29; 380/28; 380/37; 380/46; 708/492; 713/189

(58) Field of Classification Search ............ 380/28–29, 380/37, 42–45, 46; 708/490, 492; 714/781, 714/763; 326/39–40; 713/189
See application file for complete search history.

(56) References Cited

U.S. PATENT DOCUMENTS

| 3,303,477 | A |   | 2/1967 | Voigt |
|---|---|---|---|---|
| 3,805,037 | A |   | 4/1974 | Ellison |
| 4,322,577 | A | * | 3/1982 | Brandstrom ............. 380/37 |
| 4,685,132 | A | * | 8/1987 | Bishop et al. ............ 380/46 |
| 4,722,050 | A |   | 1/1988 | Lee et al. |
| 4,847,801 | A |   | 7/1989 | Tong |

(Continued)

FOREIGN PATENT DOCUMENTS

EP 00238810 9/1987

(Continued)

OTHER PUBLICATIONS

McCanny et al., Foreign applicaiton (GB 0107592.8) for U.S. Appl. No. 2003/0053623, Mar. 27, 2001.*

(Continued)

*Primary Examiner*—Hosuk Song
*Assistant Examiner*—Yin-Chen Shaw
(74) *Attorney, Agent, or Firm*—Iandiorio & Teska

(57) ABSTRACT

A programmable data encryption engine for performing the cipher function of the data encryption standard (DES) algorithm includes a Galois field linear transformer system (GFLT) responsive to a first input data block to execute an E permutation to obtain an expanded data block and combine it with a key to obtain a second larger intermediate data block in one cycle; and further includes a parallel look-up table system for implementing the unique data encryption standard selection function(s) and for condensing the second larger intermediate data block to a third data block similar to the first input data block in a second cycle and submitting it to the Galois field linear transformer system to execute a second permutation in a third cycle resulting in a data encryption standard cipher function of the first input data block.

37 Claims, 10 Drawing Sheets

U.S. PATENT DOCUMENTS

| | | | |
|---|---|---|---|
| 4,852,098 A | 7/1989 | Brechard et al. | |
| 4,918,638 A * | 4/1990 | Matsumoto et al. | 708/492 |
| 4,975,867 A | 12/1990 | Weng | 708/492 |
| 5,062,057 A | 10/1991 | Blacken et al. | |
| 5,095,525 A | 3/1992 | Almgren et al. | |
| 5,101,338 A | 3/1992 | Fujiwara et al. | |
| 5,214,763 A | 5/1993 | Blaner et al. | |
| 5,379,243 A | 1/1995 | Greenberger et al. | |
| 5,386,523 A | 1/1995 | Crook et al. | |
| 5,446,850 A | 8/1995 | Jeremiah et al. | |
| 5,502,665 A * | 3/1996 | Im | 708/492 |
| 5,642,367 A | 6/1997 | Kao | |
| 5,689,452 A | 11/1997 | Cameron | |
| 5,696,941 A | 12/1997 | Jung | |
| 5,754,563 A | 5/1998 | White | |
| 5,832,290 A | 11/1998 | Gostin et al. | |
| 5,890,800 A | 4/1999 | Meyer | 708/492 |
| 5,964,826 A | 10/1999 | Wei | 708/492 |
| 5,996,057 A | 11/1999 | Scales, III et al. | |
| 5,996,066 A | 11/1999 | Yung | |
| 5,999,959 A | 12/1999 | Weng et al. | |
| 6,038,577 A | 3/2000 | Burshtein | 708/492 |
| 6,049,815 A | 4/2000 | Lambert et al. | |
| 6,067,609 A | 5/2000 | Meeker et al. | |
| 6,121,791 A | 9/2000 | Abbott | |
| 6,138,208 A | 10/2000 | Dhong et al. | |
| 6,141,786 A * | 10/2000 | Cox et al. | 714/763 |
| 6,199,086 B1 | 3/2001 | Dworkin et al. | |
| 6,199,087 B1 | 3/2001 | Blake et al. | |
| 6,199,088 B1 | 3/2001 | Weng et al. | |
| 6,208,163 B1 * | 3/2001 | Wittig et al. | 326/39 |
| 6,223,320 B1 | 4/2001 | Dubey et al. | |
| 6,230,179 B1 | 5/2001 | Dworkin et al. | |
| 6,246,768 B1 | 6/2001 | Kim | |
| 6,279,023 B1 | 8/2001 | Weng et al. | |
| 6,285,607 B1 | 9/2001 | Sinclair | |
| 6,298,136 B1 * | 10/2001 | Den Boer | 380/29 |
| 6,317,763 B1 | 11/2001 | Vatinel | |
| 6,343,305 B1 | 1/2002 | Koç et al. | |
| 6,349,318 B1 | 2/2002 | Vanstone et al. | |
| 6,377,969 B1 * | 4/2002 | Orlando et al. | 708/492 |
| 6,384,713 B1 | 5/2002 | Yu | |
| 6,389,088 B1 | 5/2002 | Blois et al. | |
| 6,415,030 B2 * | 7/2002 | Matsui et al. | 380/37 |
| 6,434,662 B1 | 8/2002 | Greene et al. | |
| 6,480,845 B1 | 11/2002 | Egolf et al. | |
| 6,539,477 B1 | 3/2003 | Seawright | |
| 6,587,864 B2 | 7/2003 | Stein et al. | |
| 6,766,344 B2 * | 7/2004 | Dubey et al. | 708/492 |
| 6,779,011 B2 | 8/2004 | Weng et al. | 708/492 |
| 2002/0003876 A1 * | 1/2002 | Lim | 380/29 |
| 2002/0021802 A1 * | 2/2002 | Muratani et al. | 380/29 |
| 2002/0041685 A1 | 4/2002 | McLoone et al. | |
| 2002/0051537 A1 * | 5/2002 | Rogaway | 380/46 |
| 2002/0147825 A1 | 10/2002 | Stein et al. | |
| 2002/0156823 A1 | 10/2002 | Weng et al. | |
| 2002/0159599 A1 * | 10/2002 | Matsui et al. | 380/263 |
| 2003/0039355 A1 | 2/2003 | McCanny et al. | |
| 2003/0053623 A1 * | 3/2003 | McCanny et al. | 380/37 |
| 2003/0105791 A1 | 6/2003 | Stein et al. | |
| 2003/0110196 A1 | 6/2003 | Stein et al. | |
| 2003/0115234 A1 | 6/2003 | Stein et al. | |
| 2003/0133568 A1 | 7/2003 | Stein et al. | |
| 2003/0140211 A1 | 7/2003 | Stein et al. | |
| 2003/0140212 A1 | 7/2003 | Stein et al. | |
| 2003/0140213 A1 | 7/2003 | Stein et al. | |
| 2003/0149857 A1 | 8/2003 | Stein et al. | |
| 2004/0210618 A1 | 10/2004 | Stein et al. | |
| 2005/0058285 A1 | 3/2005 | Stein et al. | |

FOREIGN PATENT DOCUMENTS

| | | |
|---|---|---|
| EP | 1 246 389 A1 | 10/2002 |
| GB | 2343281 | 5/2000 |
| JP | 11163262 | 6/1999 |
| JP | 11212451 | 8/1999 |
| JP | 2000-091435 | 3/2000 |
| JP | 2001-034167 | 2/2001 |
| JP | 2001-084242 | 3/2001 |

OTHER PUBLICATIONS

McCanny et al., Foreign application (GB 0108392.2) for U.S. Appl. No. 2003/0053623, Apr. 4, 2001.*

Viktor Fischer, *Realization of the Round 2 AES Candidates Using Altera FPGA*, (Jan. 26, 2001) <http://esrc.nist.gov/CryptoToolkit/aes/roun2/conf3/papers/24-vfischer.pdf> (Micronic—Kosice, Slovakia).

Máire McLoone and J.V. McCanny, *High Performance Single-Chip FPGA Rijndael Algorithm Implementations*, CHES 2001 Proc, LNCS 2162, 65-76 (C.K. Koç et al. eds. May 16, 2001).

elixent, *Changing the Electronic Landscape* (2001) <http://www.elixent.com> (elixent—Bristol, UK).

elixent Application Note *JPEG Codec* (Dec. 9, 2002) <http://www.elixent.com/assets/jpeg-coder.pdf> (elixent—Bristol, UK).

U.S. Appl. No. 10/440,330, filed May 16, 2003, Stein et al.

U.S. Appl. No. 10/395,620, filed Mar. 24, 2003, Stein et al.

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

Horng et al., IEEE, *Fast Inverters and Dividers for Finite Field FG(2m)*, 1994 pp. 206-211.

Huang et al., *High-Speed Easily Testable Galois-Field Inverter*, Sep. 2000, IEEE Transactions on Circuits and Systems-II: Analog and Digital Signal Processing, vol. 48, No. 9, pp. 909-918.

Popovici et al., IEEE, Electronics Letters, *Division Algorithm over GF(2m)*, Sep. 17, 1998, pp. 1843-1844.

* cited by examiner

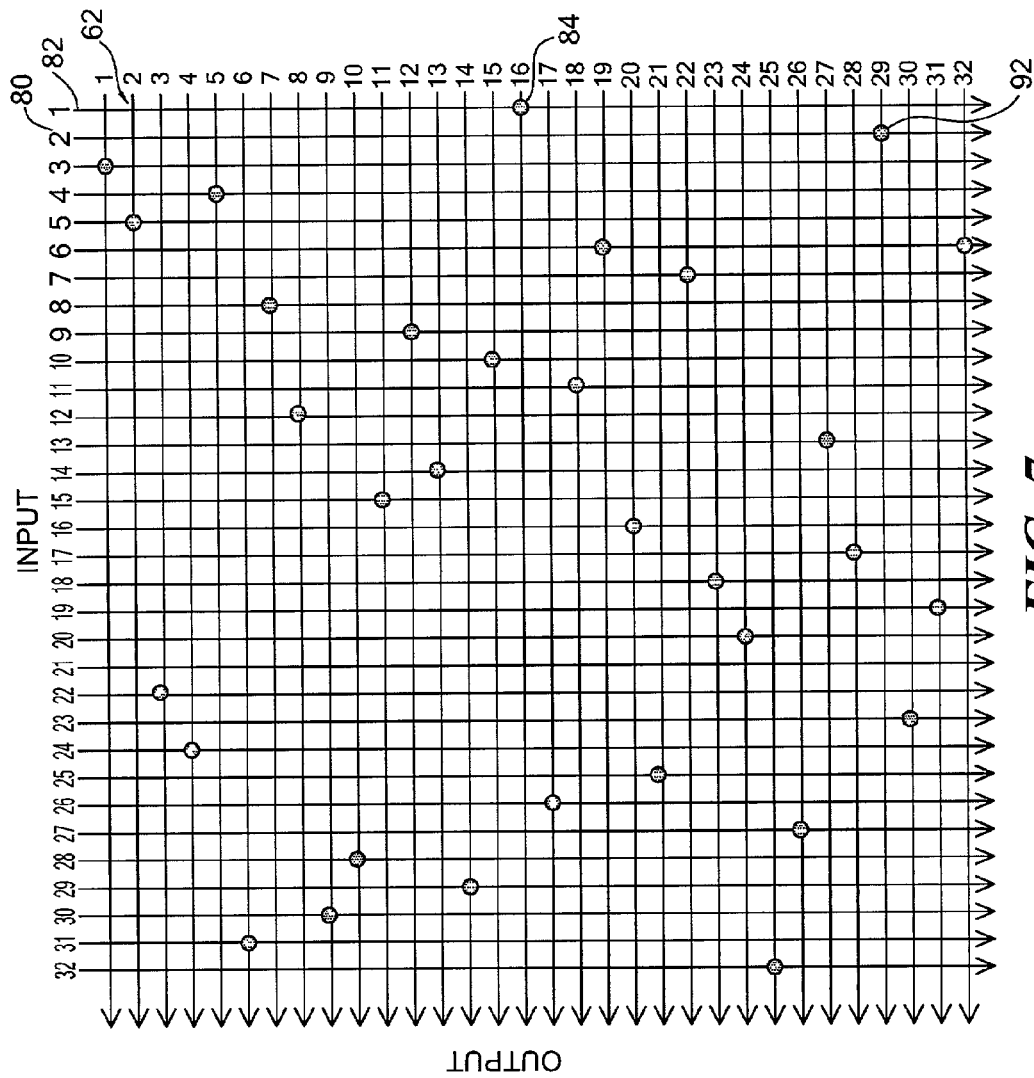

US 7,283,628 B2

PROGRAMMABLE DATA ENCRYPTION ENGINE

RELATED APPLICATIONS

This application claims priority of U.S. provisional applications, GF2-ALU, Stein et al., Ser. No. 60/334,662, filed Nov. 30, 2001 (AD-239J), PROGRAMMABLE GF2-ALU LINEAR FEEDBACK SHIFT REGISTER—INCOMING DATA SELECTION, Stein et al., Ser. No. 60/341,737, filed Dec. 18, 2001 (AD-300J), METHOD FOR DATA ENCRYPTION STANDARD (DES) USING GF2-ALU AND 8 WAY PARALLEL LUT, Stein et al., Ser. No. 60/341,711, filed Dec. 18, 2001 (AD-297J), and 8 WAY PARALLEL LOOK UP TABLE, Stein et al., Ser. No. 60/355,337, filed Feb. 7, 2002 (AD-305J).

FIELD OF THE INVENTION

This invention relates to a programmable data encryption engine for performing the cipher function of the data encryption standard (DES) and also the input permutation and reverse input permutation.

BACKGROUND OF THE INVENTION

An encryption engine for performing the American National Standard Institute (ANSI) data encryption standard (DES) algorithm encipher and deciphers blocks of data, typically 64 bits (bit packet) using a key. Deciphering is accomplished using the same key that was used for encrypting but with the schedule of addressing the key bits altered so that the deciphering is the reverse of the encryption process. A block to be encrypted is subjected to an initial permutation, IP, and then to a complex key—dependent computation, and finally to a permutation $IP^{-1}$ that is the inverse of the initial permutation. The key-dependent computation can be simply defined in terms of a function, f, called the cipher function. For example, after the initial permutation IP, the 64 bit data block is split into to 32 bit data blocks LO and RO. The permuted input block is then input to the cipher function f, which operates on two blocks, one of 32 bits and one of 48 bits. In performing the f function RO is subject to expansion permutation E, resulting in a 48 bit block which is X-ORed with a 48 bit key, the result of which is condensed from 48 bits back to 32 bits using eight selection functions $S_1$-$S_8$, then subjected to permutation P that provides the cipher 32 bit output. The output form the last cipher function is submitted to the reverse initial permutation $IP^{-1}$. These functions and permutations are normally done in hardware such as application specific integrated (ASIC) circuits which are inflexible: they are dedicated to the specific functions and permutations designed into them. Software implementation would be advantageous because it would allow easy adaptations to emerging standards. However, in software, the increase in cycle time measured in mega instructions per second [mips] is prohibitive. To permute a single bit in a conventional controller or digital signal processor (DSP) three instructions are needed: extracting the bit (AND), shifting the bit to the right position and deposit (OR). Thus, just to accomplish permutation E (48 bits) and permutation P (32 bits) will require 240 cycles, plus at least three instructions per look-up in the eight selection functions ($S_1$-$S_8$) which will require an additional 24 cycles for a total of 264 cycles to process one cipher function. In DES there are sixteen f functions to be performed i.e. 16×264=4,224 [cycles/bit packet] and in triple DES there are forty-eight to be performed i.e. 48×264=12,672 [cycles/bit packet]. Given a 10 megabit data stream coming over the internet or other data source which results in $10\times10^6/64$=156250 [bit packets/second]. Thus, 4,224×156250=660 [Mips] for a DES, and 1980 [Mips] for 3DES. For faster data input systems, e.g., modems at 40 megabit/second the time required is 7920 [Mips] all well beyond current processor capabilities.

BRIEF SUMMARY OF THE INVENTION

It is therefore an object of this invention to provide an improved data encryption engine for performing the cipher function of the data encryption standard (DES).

It is a further object of this invention to provide such an improved programmable data encryption engine for performing the cipher function of the data encryption standard (DES) implementable in software.

It is a further object of this invention to provide such an improved programmable data encryption engine for performing the cipher function of the data encryption standard (DES) which is much faster by two orders of magnitude.

It is a further object of this invention to provide such an improved programmable data encryption engine for performing the cipher function of the data encryption standard (DES) which is extremely flexible and can be re-programmed for many different permutations and applications.

The invention results from the realization that a faster more adaptable, programmable software implemented data encryption engine for performing the data encryption standard (DES) algorithm can be achieved using a Galois field linear transformer (GFLT) system to implement each permutation and a parallel look-up table to implement the selection functions (S-Box) to accomplish the DES cipher key and E permutations in just one cycle and the entire cipher function in just three cycles.

This invention features a programmable data encryption engine for performing the cipher function of the data encryption standard (DES) algorithm including a Galois field linear transformer (GFLT) system responsive to a first input data block to execute an E permutation to obtain an expanded data block and combine it with a key to obtain a second larger intermediate data block in one cycle. The invention also further features a parallel look-up table system which implements the unique data encryption standard selection function(s) and condenses the second larger intermediate data block to a third data block similar to the first input data block in a second cycle and submits it to the Galois field linear transformer system to execute a second permutation in the third cycle resulting in a data encryption standard cipher function of the first input data block.

In a preferred embodiment the Galois field linear transformer system may include a first Galois field linear transformer circuit responsive to the first input data block and a second Galois field linear transformer circuit responsive to the third data block from the parallel look-up system. Each Galois field linear transformer circuit may include a matrix responsive to a number of input bits in one or more bit streams and may have a plurality of outputs for providing the Galois field linear transformation of those bits. The matrix may include a plurality of cells, each cell may include an exclusive OR logic circuit. An AND logic circuit may have an output connected to the exclusive OR logic circuit and an input connected to one of said input bits, and a programmable storage device may provide an input to its associated AND logic circuit for setting the matrix to obtain a multi-cycle Galois field linear transformation of the inputs in a single cycle. The Galois field linear transformer system may include a reconfigurable input Galois field linear transformer circuit. The reconfigurable input Galois field linear transformer may include a Galois field linear transformer having a matrix of cells, a plurality of storage planes for storing control patterns representing a number of different functions, a storage plane selector circuit for selecting a said storage plane representing a said function for enabling the cells of the matrix which define that function, and a reconfigurable input circuit for delivering input data to the enabled cells to apply that function to the input data. The parallel look-up table system may include a memory, a plurality of look-up tables stored in the memory, a row index register for holding the values to be looked up in the the look-up tables, a column index register for storing a value representing the starting address of each look-up table stored in the memory, and an address translation circuit responsive to the column index register and the row index register to simultaneously generate an address for each value in the row index register to locate in parallel the functions of those values in each look-up table. There may be a key generator system for selectively providing a plurality of keys to the Galois field linear transformer system. The key generator system may include a key register for storing the keys. The key generator system may include a key generator circuit responsive to a master key for generating the keys. The key generator circuit may include a Galois field linear transformer circuit. The key generator circuit may be included in Galois field linear transformer system. The Galois field linear transformer system may be a reconfigurable input Galois field linear transformer circuit with a plurality of storage planes, one associated with each of the permutations. The Galois field linear transformer system may be a reconfigurable input Galois field linear transformer circuit and may include a storage plane for defining the key generator circuit. The Galois field linear transformer system may include a set of key selector cells for combining the key with the expanded data block. The key selector cell may include a gate circuit for transmitting a data signal, and a latch circuit for selectively enabling the gate circuit to pass the data signal. The latch circuit may include a flip-flop circuit. The gate circuit may include a pair of AND gates and an OR gate. The gate circuit may include a two to one mux circuit. The Galois field linear transformer system may include a storage plane for defining the initial permutation and the reverse initial permutation of the data encryption standard algorithm.

BRIEF DESCRIPTION OF THE DRAWINGS

Other objects, features and advantages will occur to those skilled in the art from the following description of a preferred embodiment and the accompanying drawings, in which:

FIGS. 5 and 6 are diagrams of the settings of the Galois field linear transformers (GFLT) of FIG. 4 to perform the P and E bit permutations;

FIG. 7 is a schematic diagram showing a GFLT set to perform the P permutation of FIG. 5;

PREFERRED EMBODIMENT

Figure 1:
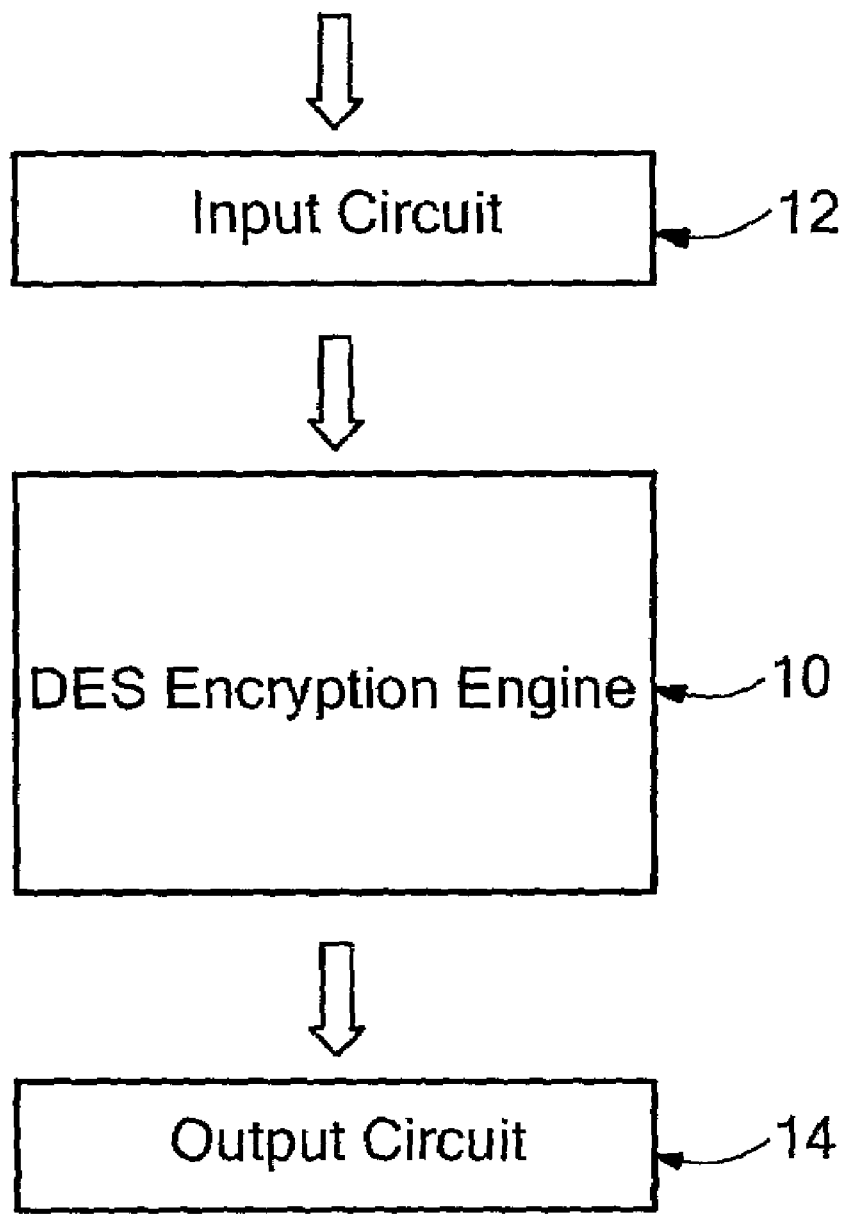
FIG. 1 is a simplified schematic block diagram of a generic encryption engine.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
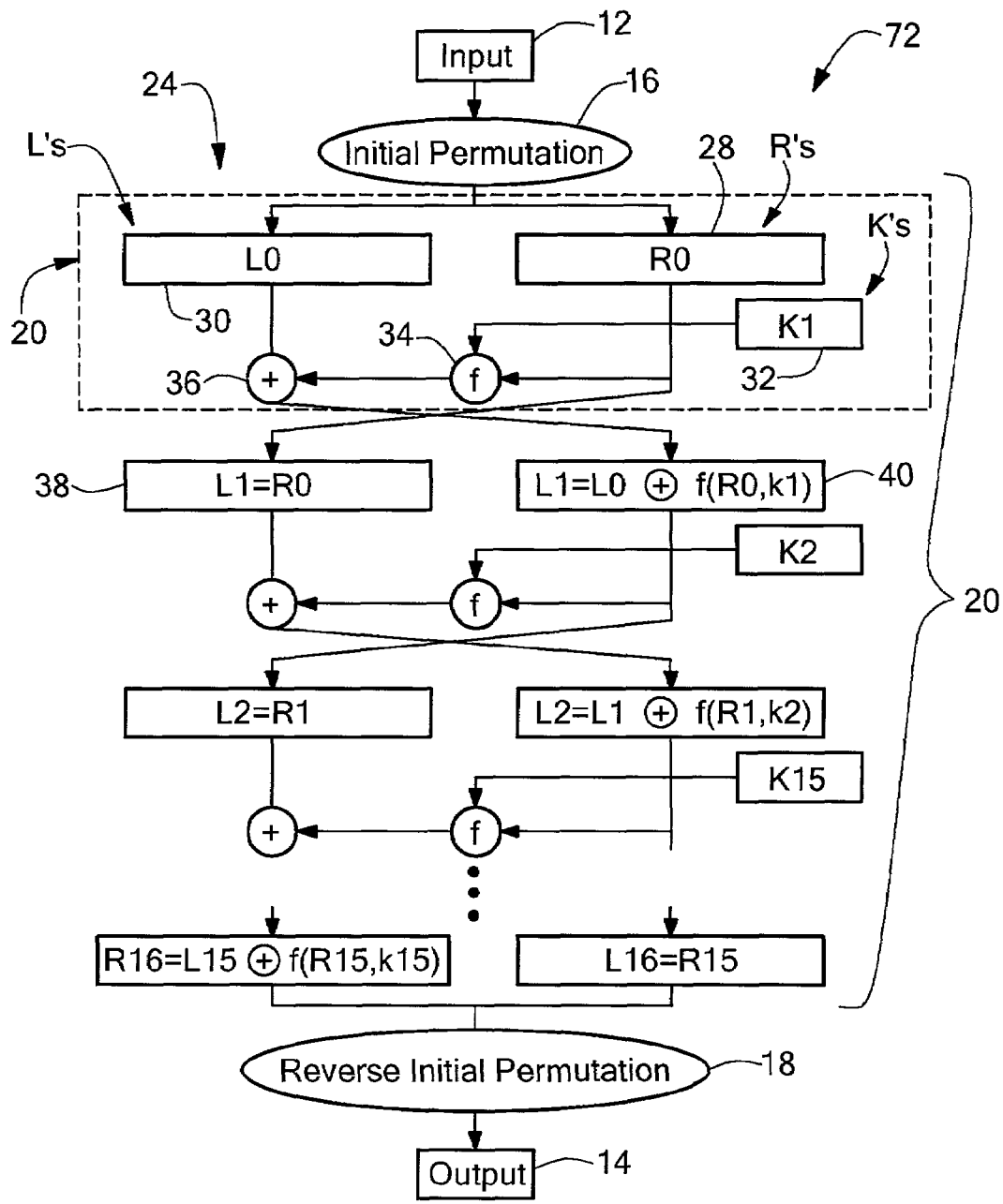
FIG. 2 is a more detailed schematic block diagram of an encryption engine for carrying out the American National Standard Institute (ANSI) data encryption standard (DES) algorithm.

DES data encryption engine 10 performs the standard DES algorithm. Encryption engine 10 receives a 64 bit word from input circuit 12 and, after the encryption algorithm is applied, delivers a 64 bit word to output circuit 14. The DES algorithm is a standard endorsed by the American National Standard Institute (ANSD and as shown in FIG. 2 it receives a 64 bit word input at input 12, performs an interim permutation and provides the 64 bit word output at 14. In the interim it performs an initial permutation 16, IP, and a final reverse initial permutation 18, IP$^{-1}$, and in between it does a series of sixteen iterations 20; in 3DES implementations there are forty-eight iterations 20.

Each of the iterations 20 receives one half of the 64 bit word or a 32 bit word in the R registers 22 and the other 32 bit word in the L registers 24. Each iteration is exactly the same and will be explained with respect to the first iteration 26. There it can be seen that register $R_0$ 28 receives one 32 bit word. Register $L_0$ 30 receives the other 32 bit word. The 32 bit word in $R_0$ register 28 is combined with 48 bit key word 32 in a cipher function circuit 34. The output from cipher function circuit 34 is delivered to exclusive OR circuit 36 where it is combined with the 32 bit word in $L_0$ register 24. The output of this iteration is delivered to the input of the next iteration: the output from $R_0$ register 28 is delivered to $L_1$ register 38, the output from exclusive OR circuit 36 is delivered to $R_1$ register 40. This continues through the rest of the sixteen iterations, after which the two 32 bit words are combined and the reverse initial permutation, IP$^-$, is effected at 18. The initial permutation IP, the reverse permutation IP$^-$, the keywords KS, and the manipulations occurring in the cipher function circuits are all clearly defined by the ANSI DES standards.

Figure 3:
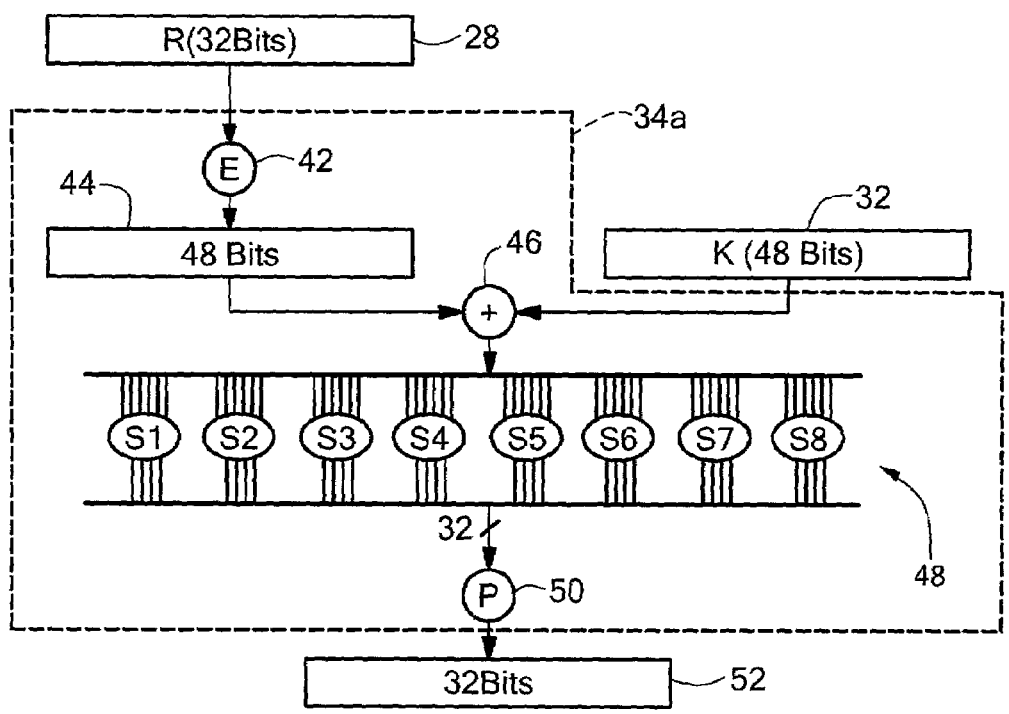
FIG. 3 is a more detailed schematic block diagram of the cipher function f portion of a DES encryption engine.

A typical cipher function circuit 34, FIG. 3 accepts the 32 bit word from $R_0$ register 28 for example, performs on it an expansion permutation 42 to produce a 48 bit word at 44, which is combined with the 48 bit output of key generator 32 in exclusive OR gate 46. The 48 bit output of exclusive OR circuit 46 is delivered to the selection function (S-boxes) 48 which consist of eight S boxes $S_1$-$S_8$ each of which receives 6 bit input, permutates it and converts it to a 4 bit output to provide once again a 32 bit word to permutation 50, which then provides the 32 bit output 52 that is delivered from cipher function circuit 34 to exclusive OR 36, FIG. 2 and their counterparts in each succeeding iteration.

Figure 4:
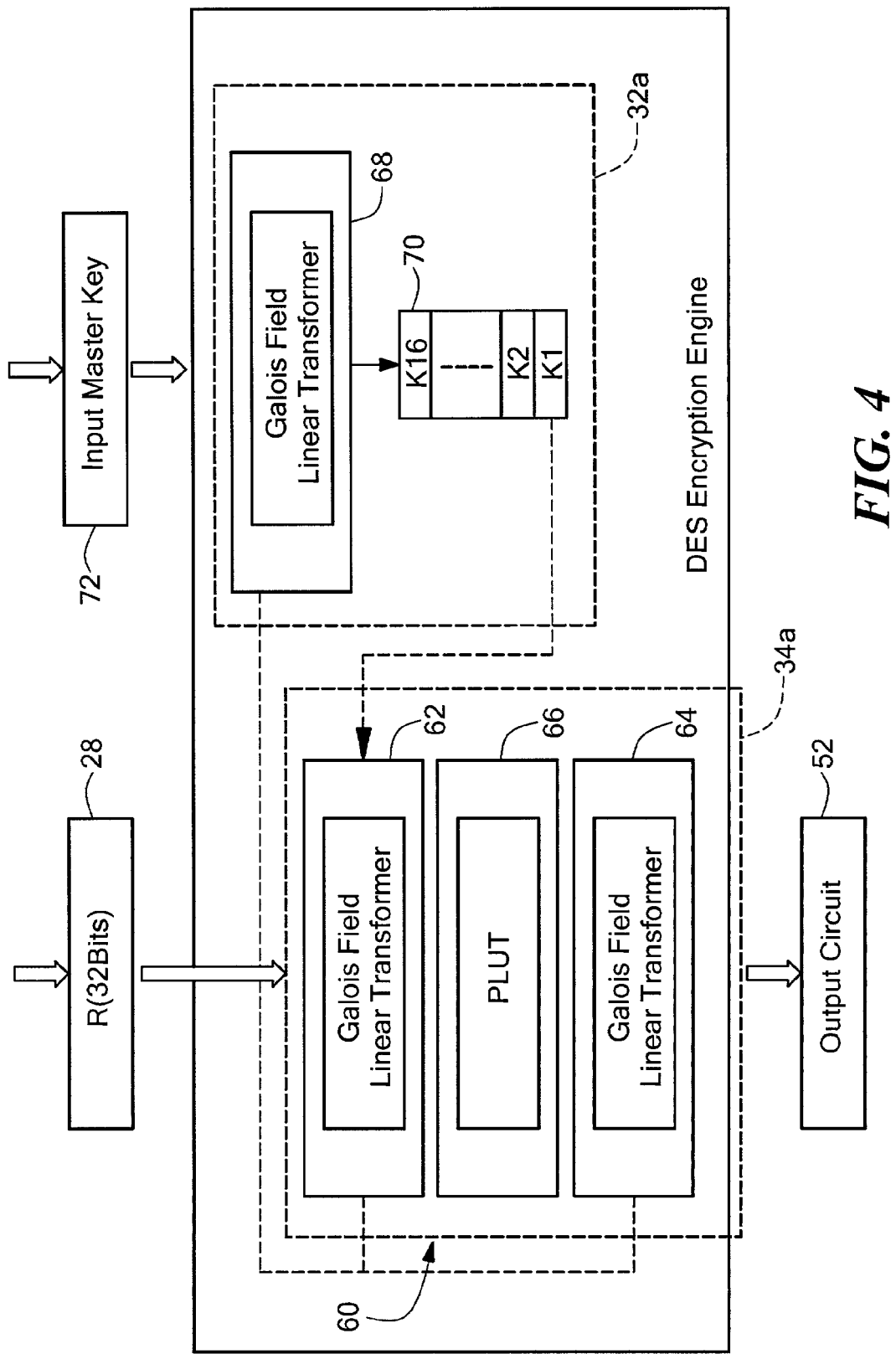
FIG. 4 is a schematic block diagram of a DES encryption engine according to this invention.

In accordance with this invention a programmable data base encryption engine 34a, FIG. 4 for performing the cipher function of the data encryption standard (DES) algorithm includes a Galois field linear transformer (GFLT) system 60 which includes two GFLT circuits 62 and 64 and a parallel look-up table (PLUT) 66. A Galois field linear transformer is fully disclosed in U.S. Pat. No. 6,587,864 B2, issued Jul. 1, 2003, and a reconfigurable parallel look-up table system is fully disclosed in U.S. Pat. No. 6,829,694 B2. issued Dec. 7, 2004, and both are hereby incorporated herein by this reference. GFLT 62 performs permutation E of FIG. 3 while GFLT 64 performs permutation P of FIG. 3. The conversion from 48 bits to 32 bits with the permutation accomplished by the selection function S boxes 48 in FIG. 3 is accomplished by the PLUT 66. A third GFLT 68 may be used to generate the sixteen key words in key register file 70. Although Galois field linear transformer system 60 is shown here as including two separate Galois field linear transformer circuits 62 and 64 and a third GFLT circuit 68 is used in the key generator circuit 32a, this is not a necessary limitation of the invention as a single reconfigurable GFLT could be used in different configurations to implement all three of these GFLT circuits and in fact it may also perform the initial permutation TIP and reverse initial permutation $IP^{-1}$. A reconfigurable input Galois field linear transformer system is fully disclosed in U.S. patent application Ser. No. 10/136,170, filed May 1, 2002, published as US 2003/0115234 A1 on Jun. 19, 2003, and is hereby incorporated herein by this reference. GFLT transformer circuit 68 generates the keywords for register 70 from a master key 72 in accordance with American National Standard Institute standards defined algorithm. One P permutation 80, FIG. 5 prescribed by ANSI is implemented in GFLT circuit 62, FIG. 7 wherein each line crossing represents an exclusive OR gate and each shaded circle indicates and enabled exclusive OR gate. For example, the first position 86 in permutation P 80 is found by going to the first column 82, noting that the shaded circle occurs at 84 which coincides with the value "16" in the first position 86 of the permutation table 80. The value 29 at the second position 88 in table 80 can be similarly found by going to the second column 90 and noting that the shaded circle appears at the $29^{th}$ crossover point 92. GFLT 64 would be similarly programmed to implement permutation E, table 100, FIG. 6. The operation of GFLTs 62 and 64 as well as that of 68 is more fully explained in U.S. Pat. No. 6,587,864 B2. issued Jul. 1, 2003.

The use of the GFLT circuits in accordance with this invention allows the E permutation and expansion and its combination with the keyword to be performed in one cycle; the contraction form 48 bits to 32 bits accompanied by the S-Boxes permutation in a second cycle and the P permutation to be accomplished in a third cycle. Previous software implementations require 250 cycles or more to do that and while hardwired circuits could operate more quickly, they are not reconfigurable.

Figure 8:
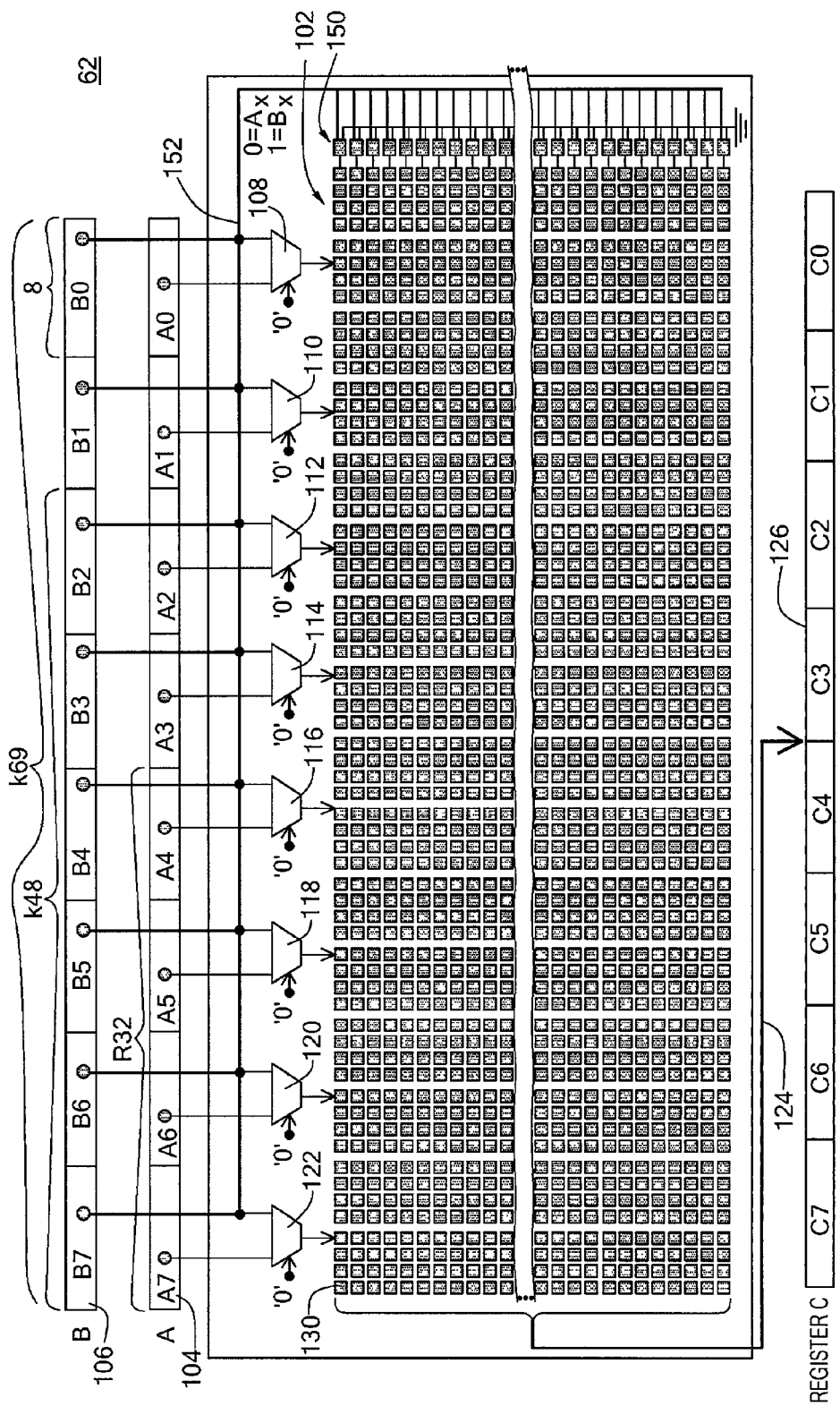
FIG. 8 is a more detailed schematic diagram of a GFLT of FIG. 4.

GFLT circuit 62, FIG. 8 is exemplary it includes a matrix 102 of 64×64 cells each capable of storing 1 bit. There are two input registers, register A 104 and register B 106, each of which can accept a 64 bit word in eight 8 bit bytes $A_0$-$A_7$, $B_0$-$B_7$, respectively. Eight byte multiplexors 108, 110, 112, 114, 116, 118, 120, and 122 service the corresponding byte sectors of each register 104 and 106. When a byte multiplexor 108-122 is presented with a "0" it passes the data from A register 104 to the cells of matrix 102. When those byte multiplexors are provided with a "1", the data from B register 106 is provided to the cells of matrix 102. The output of matrix 102 is delivered on line 124 to C register 126. All of this structure and operation is explained in U.S. Pat. No. 6,587,864 B2, issued Jul. 1, 2003 and U.S. patent application Ser. No. 10/136,170, filed May 1, 2002, published as US 2003/0115234 A1 on Jun. 19, 2003.

Figure 9:
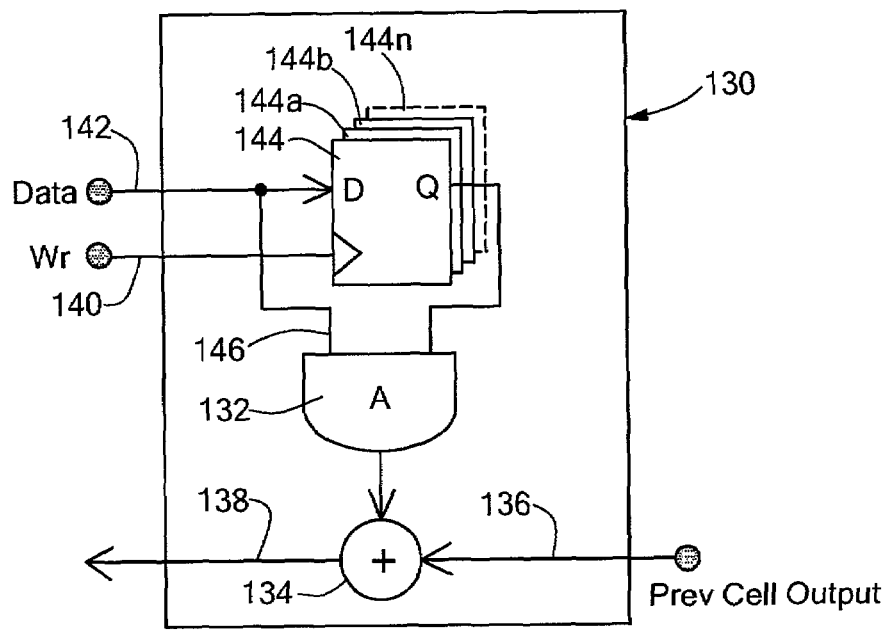
FIG. 9 is a more detailed view of a cell of the GFLT of FIG. 8.

Each cell as exemplified by cell 130 of matrix 102, FIG. 8, includes an AND gate 132, FIG. 9 and an exclusive OR gate 134. Exclusive OR gate 134 receives an input on line 136 from the previous cell and provides an output on line 138 to the next cell. Cell 130 is programmable because during the write phase when the write line 140 is enabled, if a "1" is provided on data line 142, flip-flop 144 is latched and a "1" will appear at its Q output and the input to AND gate 132. Next, during the data cycle, if data in the form of a "1" or "0" appears on line 142 the "1" or "0" will pass through input 146 of AND gate 132 and will be XORed with the signal from 136 using gate 134. Contrarily if during the write signal 140 a "0" is received on line 142, a "0" will be latched at the Q output of flip-flop 144 and AND gate 132 will receive a "0" so that, regardless of the data appearing later on line 146 during the data cycle, exclusive OR gate 134 will simply pass through the signal from 136 to 138. In this way the cells can be programmed in a pattern such as to implement the permutations P or E or IP or $IP^-$: by providing a number of flip-flops 144a, 144b, and 144n for each cell a number of storage planes are created so that each storage plane can implement, when called upon, a different pattern such as permutation E, P, IP, $IP^-$, and there can even be a storage plane programmed to perform the function of GFLT 68 in the key generator.

The ability of the GFLT circuit or system of this invention to perform permutation E and to combine it in exclusive OR circuit 46 with the key word 32 in one cycle is effected by the inclusion of a column of key elements 150 alongside the right most column of matrix 102, FIG. 8. When the key element is present in B register 106 and byte muxes 108-122 are provided with an enabling signal "0", while A register passes $R_0$ to the GFLT input the key word in B register 106 is past directly on line 152 to the key elements 150. These key elements are directly connected to the exclusive OR circuit 134 in each of their neighboring matrix cells: each of the cells in the right most column of matrix 102 have no input on line 136 from a previous cell because there is no previous cell. Thus, the key cell makes use of that connection. When the byte muxes are set to select A register and the key cells 150 are enabled, the combination of the E permutation plus the combining with the key word 32 occurs all at once in one cycle.

Figure 10:
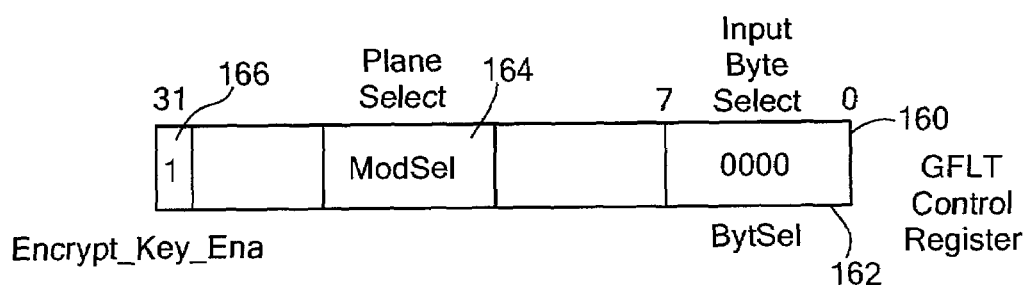
FIG. 10 is a schematic diagram of a control command for operating the GFLT of FIG. 8.

Byte muxes 108-122 and key cells 150 are controlled by a GFLT control word in GFLT control register 160, FIG. 10. The input byte selection contains either zeros to connect bytes muxes 108-122, FIG. 8, to A register 104 or ones to connect byte muxes 108-122 to B register 106. Plane select section 164 contains the bits which identify which storage plane is to be imposed upon the cells of matrix 102 and calls upon the flip-flops associated with that storage plane 144, 144a, 144b, and 144n, FIG. 9 to implement e.g., permutations P or E (or IP or $IP^-$).

Figure 11:
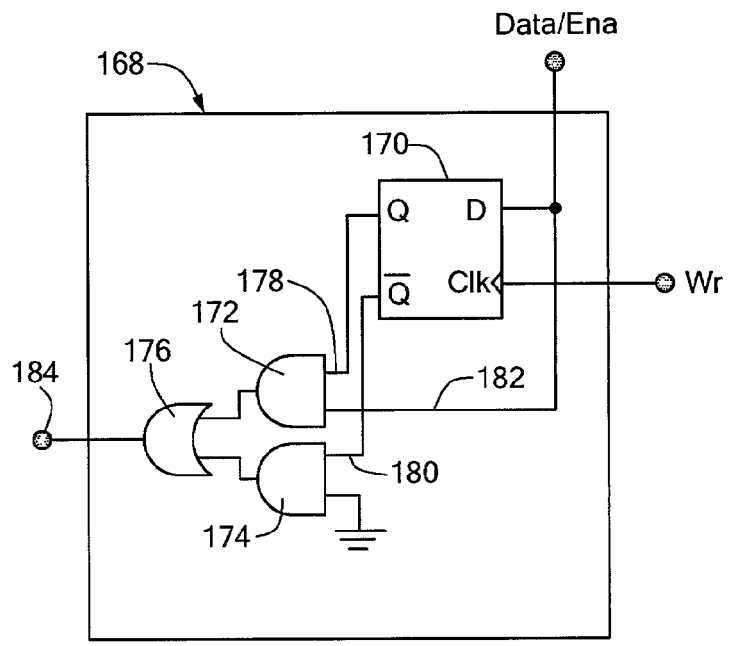
FIGS. 11 and 12 are detailed views of two embodiments of the key selector cells of FIG. 8.
Figure 12:
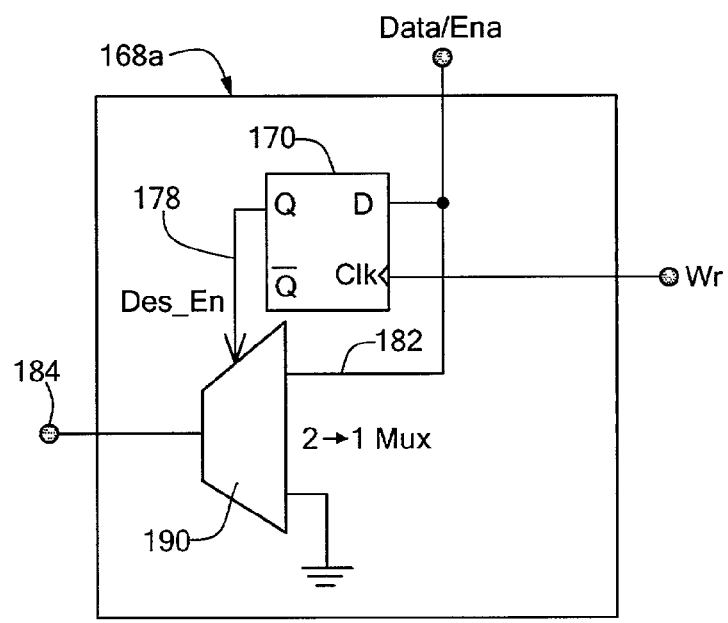

The encryption key enable (Encrypt-key-ena) bit 166, FIG. 10 is used to enable or disable the key cells 150. A "1" in section 166 enables the key cells to pass the data present in B register 106 to the cells in matrix 102. A "0" disables key cells 150 and no data is passed from them to the cells of matrix 102. Key cells 150 maybe implemented in a number of ways. In one implementation, a key cell 168, FIG. 11 includes a flip-flop 170, a pair of AND gates 172, 174 and an OR gate 176. Flip-flop 170 has two inputs, a write and a data/ena. In the write mode when the write is enabled a "1" on the data/ena line is latched into flip-flop 170 and appears at the input 178 of AND gate 172. A "0" then appears at input 180 of AND gate 174. In the data mode then should a "1" appear it passes directly on line 182 to AND gate 172 which is already enabled and so the data is passed through OR gate 176 to output 184. If during the write mode a "0" is provided at the data/ena input a "0" is latched at flip-flop 170. This appears on line 178 and disables AND gate 172 and the "1" on input 180 to AND gate 174 enables only a zero to be passed through OR gate 176 to output 184. In a second implementation, flip-flop 170 is accompanied only by a 2>1 mux 190 which operates in the same way to pass data only when its been enabled during the write mode.

Figure 13:
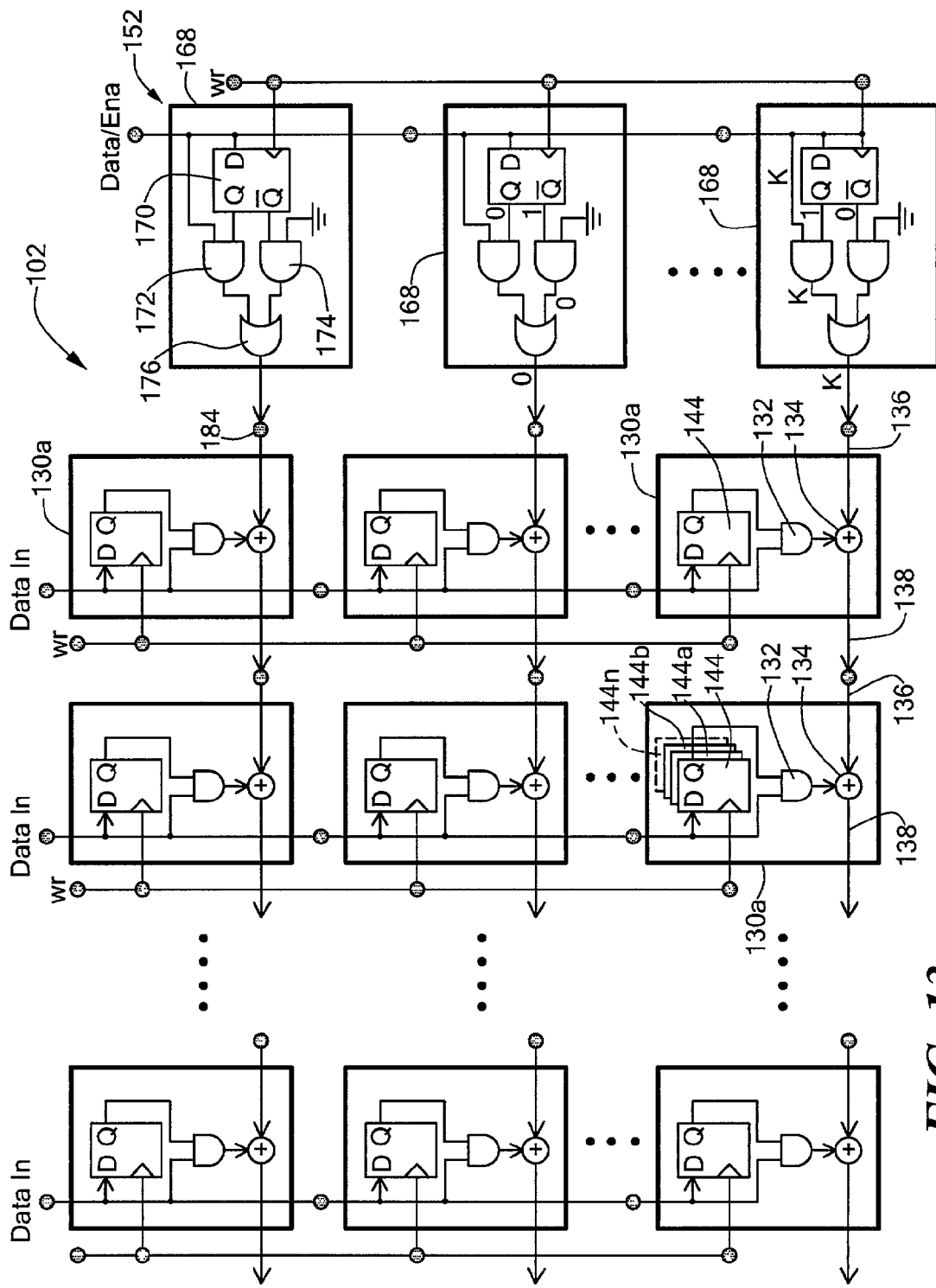
FIG. 13 is a partial more detailed schematic diagram of the GFLT of FIG. 8 implemented with the cells of FIGS. 9 and 12.

An enlarged view of a small portion of matrix 102 and the associated key cells is shown in FIG. 13 where it can be seen that each cell is constructed as cell 130, FIG. 9. Only one of the cells 130*a* is shown as having multiple flip-flops, but this for convenience only, as each of the cells would have a plurality of flip-flops associated with it if this were a reconfigurable GFLT system as more fully disclosed in U.S. patent application Ser. No. 10/136,170, filed May 1, 2002, published as U.S. 2003/0115234 A1 on Jun. 19, 2003, which could be used to implement all of the Galois field linear transformer circuits 62, 64, and 68 with a single reconfigurable Galois field linear transformer system. The key cells 150 are implemented by key cell 168, FIG. 11.

Figure 14:
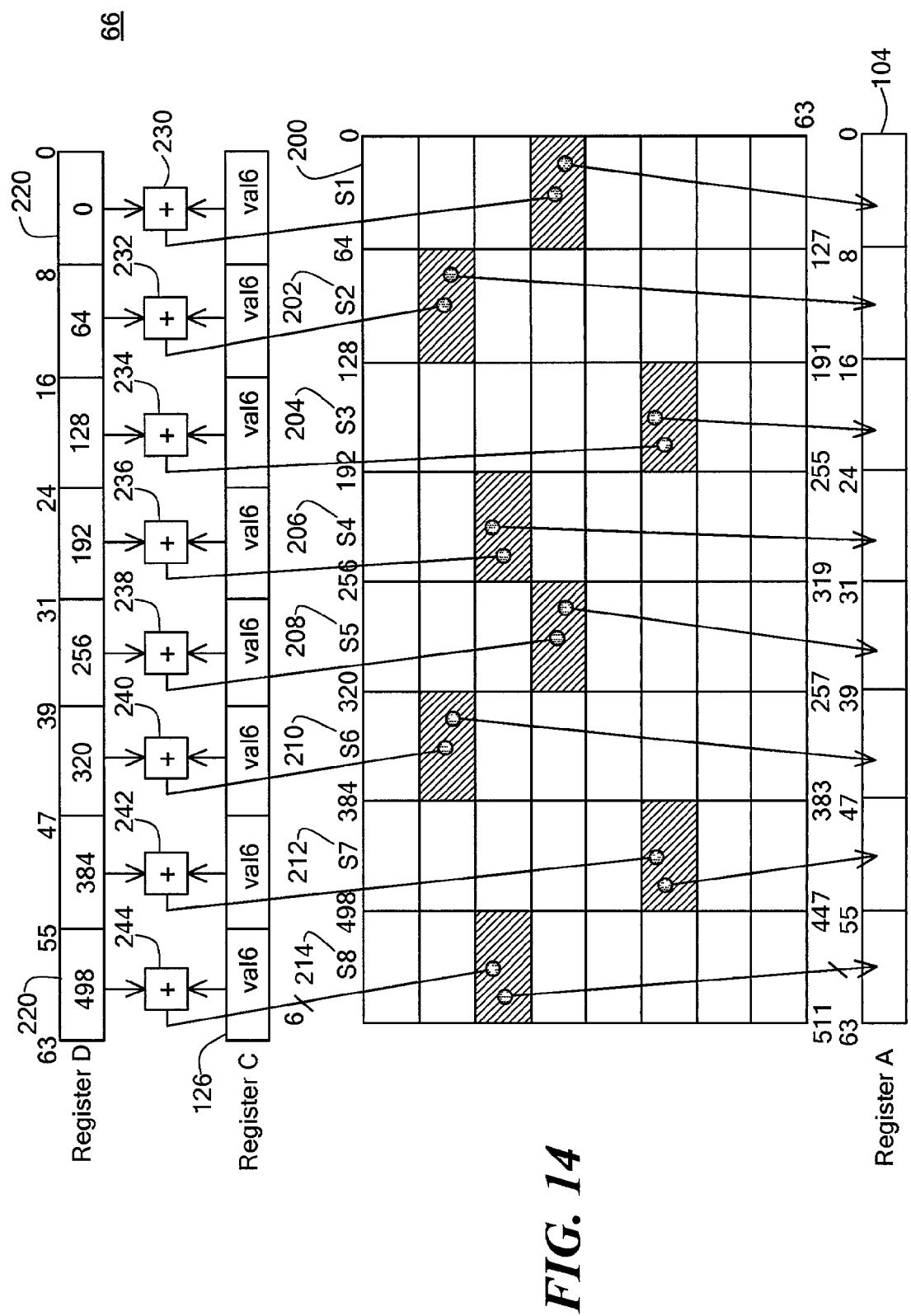
FIG. 14 is a schematic diagram of a parallel look-up table used in the engine of FIG. 4.

The performance of the selection function S box permutation and contraction of the 48 bit words to the 32 bit words as explained with respect to FIG. 3 is done in a single cycle in accordance with this invention using parallel look-up table 66, FIG. 4. As shown in FIG. 14 the eight columns 200-214 each implements one of the S boxes 51-S8 of the prior art. Each column 200-214 contains sixty-four values: $S_1$ contains values at addresses 0-63; $S_2$ contains values at addresses 64-127 and so on until $S_8$ contains values at addressees 448-511. Parallel look-up table 66 receives 48 bit words in 8 bytes with 6 bits in each byte and converts them to words of 32 bits. The 8 bytes of 6 bit values each are entered in register C 126 which is the same register C 126 of FIG. 8 which receives the output of GFLT circuit 62. These values in C register 126 are treated as addresses where the four bit permuted values in accordance with ANSI standards are stored. These addresses are computed by adding the 6 bit values with the sequential address of the S boxes $S_1$-$S_8$ as present in D register 220. The addition is performed by adders 230-244. That is, the 8 bytes of D register 220 each holds the starting address of each of the columns $S_1$-$S_8$. By adding the starting address to the column with the 6 bit value in the corresponding section of register 126, the exact address in the parallel look-up table is found and the 4 bit value there is delivered to A register 104, FIG. 8 where it can be used to perform the P permutation to provide the final 32 bit result output at 52 for this iteration. The operation of the parallel look-up table is explained more fully in U.S. Pat. No. 6,829,694 B2, issued Dec. 7, 2004. To provide the parallel look-up table a nine bit address using two 8-bit values, the bits in register 220 were shifted left by three places with respect to those in register 126. There are two additional bits available if it is desired to take the system beyond 512 to 1024 or 2048 memory locations respectively. The shift of three bits is chosen to provide a multiplier of eight since an eight byte register is used and it is not desirable to permutate inside the eight byte size.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A programmable data encryption engine for performing the cipher function of the data encryption standard (DES) algorithm comprising:
    a reconfigurable Galois field linear transformer (GFLT) system responsive to a first input data block to execute an expansion permutation to obtain an expanded data block and combine it with a key to obtain a second larger intermediate data block in one cycle the GFLT system including at least one Galois field linear transformer circuit that includes a matrix responsive to a number of input bits in one or more bit steams and has a plurality of outputs for providing the Galois field linear transformation of those bits;
    said matrix including a plurality of cells, each of said cells including an exclusive OR logic circuit, a programmable storage device, and an output and two inputs, one of the inputs for each of said cells with the exception of a first cell responsive to the output of a previous cell, in which, depending on programming of the associated storage device, the output of each of said cells is a result of the exclusive OR function of the two inputs, or each of said cells is bypassed and the output of each of said cells is the output of the previous cell; and
    a parallel look-up table system for implementing a unique data encryption standard (DES) selection function and for condensing said second larger intermediate data block to a third data block similar to said first input data block in a second cycle and submitting it to said Galois field linear transformer system to execute a second permutation in a third cycle resulting in a data encryption standard cipher function of the first input data block.

2. The programmable data encryption engine of claim 1 in which said Galois field linear transformer system includes a first Galois field linear transformer circuit responsive to said first input data block and a second Galois field linear transformer circuit responsive to said third data block from said parallel look-up system.

3. The programmable data encryption engine of claim 1 in which, each cell further includes an AND logic circuit having an output connected to the exclusive OR logic circuit and an input connected to one of said input bits, the programmable storage device providing an input to its associated AND logic circuit for setting the matrix to obtain a multicycle Galois field linear transformation of the inputs in a single cycle.

4. The programmable data encryption engine of claim 1 in which Galois field linear transformer system includes a reconfigurable input Galois field linear transformer circuit.

5. The programmable data encryption engine of claim 4 in which said reconfigurable input Galois field linear transformer circuit includes a Galois field linear transformer having a matrix of cells, a plurality of storage planes for storing control patterns representing a number of different functions, a storage plane selector circuit for selecting a said storage plane representing a said function for enabling the cells of said matrix which define that function, and a reconfigurable input circuit for delivering input data to said enabled cells to apply that function to the input data.

6. The programmable data encryption engine of claim 1 in which said parallel look-up table system includes a memory, a plurality of look-up tables stored in said memory, a row index register for holding the values to be looked up in said look-up tables, a column index register for storing a value representing the starting address of each said look-up table stored in said memory, and an address translation circuit responsive to said column index register and said row index register to simultaneously generate an address for each value in said row index register to locate in parallel the functions of those values in each look-up table.

7. The programmable data encryption engine of claim 1 further including a key generator system for selectively providing a plurality of keys to said Galois field linear transformer system.

8. The programmable data encryption engine of claim 7 in which said key generator system includes a key register for storing said keys.

9. The programmable data encryption engine of claim 8 in which said key generator system includes a key generator circuit responsive to a master key for generating said keys.

10. The programmable data encryption engine of claim 9 in which said key generator circuit includes a Galois field linear transformer circuit.

11. The programmable data encryption engine of claim 9 in which said key generator circuit is included in said Galois field linear transformer system.

12. The programmable data encryption engine of claim 1 in which said Galois field linear transformer system is a reconfigurable input Galois field linear transformer circuit with a plurality of storage planes, one associated with each of said permutations.

13. The programmable data encryption engine of claim 11 in which said Galois field linear transformer system includes a reconfigurable input Galois field linear transformer circuit and includes a storage plane for defining said key generator circuit.

14. The programmable data encryption engine of claim 1 in which said Galois field linear transformer system includes a set of key selector cells for combining said key with said expanded data block.

15. The programmable data encryption engine of claim 14 in which a said key selector cell includes a gate circuit for transmitting a data signal, and a latch circuit for selectively enabling said gate circuit to pass said data signal.

16. The programmable data encryption engine of claim 15 in which said latch circuit includes a flip-flop circuit.

17. The programmable data encryption engine of claim 15 in which said gate circuit includes a pair of AND gates and an OR gate.

18. The programmable data encryption engine of claim 15 in which said gate circuit includes a two to one mux circuit.

19. The programmable data encryption engine of claim 4 in which said reconfigurable input Galois field linear transformer system includes a storage plane for defining the initial permutation and the reverse initial permutation of the data encryption standard (DES) algorithm.

20. A programmable data encryption engine for performing the cipher function of the data encryption standard (DES) algorithm comprising:
a key generator system; and
a reconfigurable Galois field linear transformer (GFLT) system responsive to a first input data block to execute an expansion DES E permutation to obtain an expanded data block and combine it with a key from said key generator to obtain a second larger intermediate data block in one cycle the GFLT system including at least one Galois field linear transformer circuit that includes a matrix responsive to a number of input bits in one or more bit steams and has a plurality of outputs for providing the Galois field linear transformation of those bits;
said matrix including a plurality of cells, each of said cells including an exclusive OR logic circuit, a programmable storage device, and an output and two inputs, one of the inputs for each of said cells with the exception of a first cell responsive to the output of a previous cell, in which, depending on programming of the associated storage device, the output of each of said cells is a result of the exclusive OR function of the two inputs, or each of said cells is bypassed and the output of each of said cells is the output of the previous cell; and
a parallel look-up table system for implementing a unique data encryption standard (DES) selection function and for condensing said second larger intermediate data block to a third data block similar to said first input data block in a second cycle and submitting it to said Galois field linear transformer system to execute a second permutation in a third cycle resulting in a data encryption standard cipher function of the first input data block.

21. The programmable data encryption engine of claim 20 in which said Galois field linear transformer system includes a first Galois field linear transformer circuit responsive to said first input data block and a second Galois field linear transformer circuit responsive to said third data block from said parallel look-up system.

22. The programmable data encryption engine of claim 20 in which, each cell further includes an AND logic circuit having an output connected to the exclusive OR logic circuit and an input connected to one of said input bits, the programmable storage device providing an input to its associated AND logic circuit for setting the matrix to obtain a multicycle Galois field linear transformation of the inputs in a single cycle.

23. The programmable data encryption engine of claim 20 in which Galois field linear transformer system includes a reconfigurable input Galois field linear transformer circuit.

24. The programmable data encryption engine of claim 23 in which said reconfigurable input Galois field linear transformer circuit includes a Galois field linear transformer having a matrix of cells, a plurality of storage planes for storing control patters representing a number of different functions, a storage plane selector circuit for selecting a said storage plane representing a said function for enabling the cells of said matrix which define that function, and a reconfigurable input circuit for delivering input data to said enabled cells to apply that function to the input data.

25. The programmable data encryption engine of claim 20 in which said parallel look-up table system includes a memory, a plurality of look-up tables stored in said memory, a row index register for holding the values to be looked up in said look-up tables, a column index register for storing a value representing the starting address of each said look-up table stored in said memory, and an address translation circuit responsive to said column index register and said row index register to simultaneously generate an address for each value in said row index register to locate in parallel the functions of those values in each look-up table.

26. The programmable data encryption engine of claim 20 in which said key generator system includes a key register for storing said keys.

27. The programmable data encryption engine of claim 26 in which said key generator system includes a key generator circuit responsive to a master key for generating said keys.

28. The programmable data encryption engine of claim 27 in which said key generator circuit includes a Galois field linear transformer circuit.

29. The programmable data encryption engine of claim 27 in which said key generator circuit is included in said Galois field linear transformer system.

30. The programmable data encryption engine of claim 20 in which said Galois field linear transformer system is a reconfigurable input Galois field linear transformer circuit with a plurality of storage planes, one associated with each of said permutations.

31. The programmable data encryption engine of claim 29 in which said Galois field linear transformer system includes a reconfigurable input Galois field linear transformer circuit and includes a storage plane for defining said key generator circuit.

32. The programmable data encryption engine of claim 20 in which said Galois field linear transformer system includes a set of key selector cells for combining said keys with said expanded data block.

33. The programmable data encryption engine of claim 32 in which a said key selector cell includes a gate circuit for transmitting a data signal, and a latch circuit for selectively enabling said gate circuit to pass said data signal.

34. The programmable data encryption engine of claim 33 in which said latch circuit includes a flip-flop circuit.

35. The programmable data encryption engine of claim 34 in which said gate circuit includes a pair of AND gates and an OR gate.

36. The programmable data encryption engine of claim 34 in which said gate circuit includes a two to one mux circuit.

37. The programmable data encryption engine of claim 23 in which said reconfigurable input Galois field linear transformer circuit includes a storage plane for defining the initial permutation and the reverse initial permutation of the data encryption standard (DES) algorithm.

* * * * *